United States Patent [19]

Fritsch, Jr. et al.

[11] 4,142,879
[45] Mar. 6, 1979

[54] METHOD FOR PRODUCING LOW EXPANSION CERAMICS

[75] Inventors: Carl W. Fritsch, Jr., Dushore; Robert W. Wolfe, Towanda, both of Pa.

[73] Assignee: GTE Sylvania Incorporated, Stamford, Conn.

[21] Appl. No.: 750,832

[22] Filed: Dec. 15, 1976

Related U.S. Application Data

[62] Division of Ser. No. 619,206, Oct. 3, 1975, Pat. No. 4,063,955.

[51] Int. Cl.² ............... C03B 23/20; C03B 32/00
[52] U.S. Cl. ................................. 65/18; 65/33; 106/39.6; 106/52
[58] Field of Search ............... 65/33, 18; 106/39.6, 106/52

[56] References Cited

U.S. PATENT DOCUMENTS

| | | | |
|---|---|---|---|
| 3,365,314 | 1/1968 | Sack | 65/33 X |
| 3,450,546 | 6/1969 | Stong | 65/33 X |
| 3,480,452 | 11/1969 | Fleischner | 65/33 X |
| 3,490,888 | 1/1970 | Strong | 65/33 |
| 3,531,307 | 9/1970 | Rubin et al. | 106/52 |
| 3,940,255 | 2/1976 | Harrington et al. | 65/33 |
| 3,979,216 | 9/1976 | Fritsch, Jr. et al. | 65/33 X |
| 4,015,048 | 3/1977 | Martin | 65/33 X |
| 4,042,403 | 8/1977 | Reade | 65/33 |

OTHER PUBLICATIONS

"Low Expansion Ceramic Material For Catalyst Supports" by J. L. Pentacost, and J. K. Cochren.
"Development Of A Low Thermal Expansion Magnesium Aluminum Silicate Ceramic For Gas Turbine Heat Exchanger Applications" by S. T. Buljan, and R .M. Kleiner — Gas Div. of the Amer. Soc. Mech. Engineers Meeting — Houston, Tex. Mar. 2-6, 1975.

*Primary Examiner*—S. Leon Bashore
*Assistant Examiner*—Frank W. Miga
*Attorney, Agent, or Firm*—John C. Fox

[57] ABSTRACT

Low thermal expansion ceramics of essentially 100 percent cordierite solid solution are prepared by the devitrification of a glass frit compact having the nominal composition in weight percent 16 percent MgO, 30 percent $Al_2O_3$, 54 percent $SiO_2$. These ceramics exhibit adequate density and strength and are useful for example in the fabrication of gas turbine engine components such as rotor vanes and heat exchangers.

3 Claims, No Drawings

METHOD FOR PRODUCING LOW EXPANSION CERAMICS

CROSS-REFERENCE TO RELATED APPLICATION

This application is a division of Ser. No. 619,206, filed Oct. 13, 1975 now U.S. Pat. No. 4,063,955 issued Dec. 20, 1977 and assigned to the assignee of the present invention. Assignment recorded Oct. 3, 1975, Reel 3240 Frame 372.

BACKGROUND OF THE INVENTION

This invention relates to cordierite type ceramics and more particularly relates to a method for producing a low thermal expansion ceramic of essentially 100 percent cordierite solid solution.

The low expansion characteristics of cordierite ($2MgO; 2Al_2O_3; 5SiO_2$; 13.8 weight percent MgO, 34.9 weight percent $Al_2O_3$, and 51.3 weight percent $SiO_2$) and cordierite - based ceramics have been known for a long time. Industrial cordierite ceramic bodies came into use during the period 1917 to 1927. Commercial cordierite bodies produced in Europe and the United States are listed in a 1961 publication by Tyrell et al entitled "Synthetic Cordierite," Bureau of Mines Bulletin, 594, U.S. Government Printing Office (1961). The cited thermal expansion values range from about 1100 ppm to 2400 ppm in the range 25° C. to 800° C. The authors performed a comprehensive study of the devitrification of glasses in the MAS system and established the region of best cordierite formation for the system.

However, the authors gave no thermal expansion data for their devitrified glass compositions. Instead, they mixed their material with ball clay to produce fired ceramic articles with linear thermal expansions in the range of about 1800 ppm from 25° C. to 800° C. Since they were primarily interested in the dielectric properties of these ceramics, 1800 ppm thermal expansion was apparently satisfactory for such applications.

Recent interest in the use of ceramics as replacements for metals and high temperature alloys in high temperature applications such as gas turbine engine components has focused attention on the need for low thermal expansion ceramic bodies having corresponding high thermal shock resistance. Among the candidates for such applications are lithium aluminum silicate-based ceramics and magnesium aluminum silicate-based ceramics, with MAS based compositions presently being preferred for their good mechanical properties and corrosion resistance to road and marine salt and sulphorous combustion products.

It is therefore felt that an MAS-based ceramic body having low thermal expansion and satisfactory levels of other physical properties such as density and strength would represent an advancement in the art.

SUMMARY OF THE INVENTION

In accordance with the invention it has been discovered that ceramic bodies of essentially 100 percent cordierite solid solution showing linear thermal expansions of typically 600 ppm to 900 ppm over the range 25° C. to 800° C. may be produced in the MAS system by devitrification of compacts of finely divided particles of glass having the composition in the range 14 to 18 weight percent MgO, 28 to 32 weight percent $Al_2O_3$, and 52 and to 56 weight percent $SiO_2$, with preferred compositions ranging from 15 to 17 weight percent MgO, 29 to 31 weight percent $Al_2O_3$, and 53 to 55 weight percent $SiO_2$.

Ceramics prepared by this method, in addition to having low linear thermal expansions, exhibit homogeneous microstructures and satisfactory density, and mechanical strength. In addition, the sintering range of green compacts of the glass particles is in general broader than that for conventionally produced cordierite bodies. Sintering range is here defined as the temperature interval over which satisfactory physical properties may be achieved. This parameter may be significant in the final firing of large pieces, since the temperature gradient across the piece must be smaller than the sintering range. Present designs being considered for both gas turbine engine rotary regenerator structures and industrial heat regenerator structures contemplate diameters of several feet, wherein significant temperature gradients could be encountered.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The raw materials used to form the glass may be the oxides or materials which upon heating convert to the oxides, for example, hydroxides, carbonates, sulfates, etc. Commercial grade raw materials having up to 2 percent total impurities, and preferably up to 1 percent total impurities may be used. Beyond this level, the presence of impurities or intentional additives such as nucleating agents (eg., $ZrO_2$, $TiO_2$, Si) tend to increase undesirably the linear thermal expansion of the final ceramic body.

The mixture of raw materials in the desired proportions may be prereacted or calcined at an intermediate temperature for several hours, for example from 800° C. to 1000° C. for 1 to 4 hours. This prereacting treatment serves to reduce the bulk of the powder and also to convert precursors such as hydroxides or carbonates to the oxide.

The mixture is melted in suitable noncontaminating media such as precious metal, refractory metal or alloy or refractory oxide container, such as a platinum or alumina container at a temperature of from about 1490° C. to about 1600° C. for about 4 to 24 hours, the longer times corresponding to the lower temperature. Within this range the melting time at a specific temperature should be sufficient to achieve substantially complete melting and homogenization of the reactants. The melt is then cooled preferably by a water or air quench wherein glass without seeds or cords is formed. While such quenching may be performed by submerging the entire crucible into water or air, the viscosity of the glasses is low enough that they may also be poured from the crucible, for example onto a chill plate or into water.

The glasses are then reduced to finely divided particles such as by grinding in a mortar and pestle or ball milling and preferably screened to obtain a particle size distribution consistent with subsequent envisioned forming operations. For example, where the particles are to be dry pressed without a binder to form a green compact, suitable particle sizes are three parts −250 mesh to 1 part −115 +250 mesh. In addition −325 mesh powder is also suitable for the formation of compacts by dry pressing.

The compacts are then heated to a temperature sufficient to induce devitrification and sintering together of the particles to form a structurally integrated ceramic body. Firing temperatures are from 1350° to 1425° C. above which complete devitrification may not be obtained and below which incomplete sintering may occur. Times required to achieve substantially complete devitrification range from about 2 to 10 hours. Heating up to the firing temperature should be at a rate consistent with mechanical strength of the green compact. A typical maximum heating rate for dry pressed compacts is 150° C. per hour.

EXAMPLE I 16 grams MgO, 30 grams $Al_2O_3$ and 54 grams $SiO_2$ are melted in a platinum crucible at 1550° C. for 4 hours. The glass is then quenched by pouring into water, ground in mortar pestle to −325 mesh, and formed by dry pressing into a 2.5 by 0.25 by 0.25 inch bar. The bar is then heated at a rate of 150° C. per hour to a maximum temperature between 1350° and 1425° C. and soaked within this temperature range for 10 hours. The bar is then cooled to about 500° C. and removed from the furnace. This procedure is then repeated for a 2:2:5 cordierite composition (13.8 percent MgO, 34.9 percent $Al_2O_3$, 51.3 percent $SiO_2$) and thermal expansion in centimeters per centimeter per °C. measured within the temperature range 25° C. to 800° C. Results are reported in Table I below together with thermal expansion values of a commercial synthetic cordierite body produced from a 1:1 mixture of sierralite and kaolin with 5 percent Zr addition, and a body of sierralite, a high purity California chlorite mineral having a typical analysis of 30.5 percent $SiO_2$, 31.1 percent MgO, 2.1 percent $Fe_2O_3$, 22.4 percent $Al_2O_3$, 0.08 percent $TiO_2$, 0.15 percent CaO, 0.20 percent $K_2O$, 0.08 percent $Na_2O$.

TABLE I

| | Composition | Thermal Expansion cm/cm° × 10° | 25–800° C. ppm |
|---|---|---|---|
| 1. | 16 MgO-30$Al_2O_3$-54$SiO_2$ | 0.95 | 735 |
| 2. | 13.8MgO-34.9$Al_2O_3$-51.3$SiO_2$ (2:2:5) | 1.47 | 1140 |
| 3. | Morris Synthetic Cordierite | 1.84 | 1426 |
| 4. | Sierralite | 1.43 | 1103 |

As may be seen from Table I, thermal expansion for a composition according to this invention is significantly lower than for the several commercial cordierite bodies and the 225 composition prepared in accordance with this Example.

EXAMPLE II

Raw materials of reagent grade MgO, $SiO_2$, $Al(OH)_3$, $ZrO_2$ and Si were used to form mixes having the compositions shown in Table II.

TABLE II

| 5. | 13.8 MgO − 34.9 $Al_2O_3$ − 51.3 $SiO_2$ |
| 6. | 16 MgO − 30 $Al_2O_3$ − 54 $SiO_2$ |
| 7. | 16 MgO − 30 $Al_2O_3$ − 54$SiO_2$ + 2$ZrO_2$ |
| 8. | 16 MgO − 30 $Al_2O_3$ − 54 $SiO_2$ + ½ Si |

$ZrO_2$ and Si were added as nucleating agents. The samples are numbered 5 through 8 to distinguish them from samples 1 through 4 listed in Table I. The mixtures were dry blended and prereacted at 1100° C. for 2 hours. The prereacted compositions were then melted in platinum crucibles at about 1490° C. in a globar furnace, and soaked at temperature over night. The glasses were then quenched by plunging the crucibles into water. Compositions 5 and 6 formed clear glasses without seeds or cords, and the viscosity was low enough so that they could be poured. Composition 7 had a high viscosity and was opaque, indicating residual undissolved crystalline material. Composition 8 showed a two phase separation, both glasses being of high viscosity but transparent. Composition 7 was remelted at about 1550° C. and the resulting glass from this remelting was transparent. Composition 8 was not remelted. The glasses were ground in a mortar and pestle and screened. Powders containing 3 parts −250 mesh to 1 part −115 +250 mesh were dry pressed without a binder at about 220,000 psi to produce sample bars about ¼ inch by ¼ inch by 1 inch in length. The bar samples were placed in a globar furnace at room temperature and brought to maximum furnace temperature at a rate of about 150° C. per hour. Firing temperatures ranged from 1350° to 1400° C. with soak times of about 10 hours unless otherwise noted. The furnace was then cooled to about 500° C. to 600° C. whereupon the samples were removed and evaluated for physical properties.

X-ray powder diffraction patterns of samples 5 and 6 showed cordierite as the only crystalline phase present. This fact together with the absence of an amorphorous phase in petrographic thin sections confirm that these glasses devitrify to essentially cordierite or cordierite solid solution. Table III presents results for thermal expansion, density, open porosity and average modulus of rupture (6 specimens) respectively.

TABLE III

| Sample # | Composition. (Wt. %) | Firing Max. Temp. (°C) | Time | XRD* Phases | Density (g/cm³) | Average Modulus of Rupture (psi) | Thermal Exp. Total, (ppm) (25–800° C) |
|---|---|---|---|---|---|---|---|
| 6 | 16 MgO, 30$Al_2O_3$, 60$SiO_2$ | 1350 | 10 | Cordierite | 2.19 | 6,070 | 814 |
| " | " | 1350 | 10 | " | 2.19 | — | 837 |
| " | " | 1350 | 10 | " | 2.15 | 7,580 | 851 |
| " | " | 1350 | 10 | " | 2.15 | — | 899 |
| " | " | 1375 | 10 | " | 2.30 | 8,680 | 745 |
| " | " | 1375 | 20 | " | 2.21 | — | 855 |
| " | " | 1375 | 20 | " | 2.26 | 8,220 | 837 |
| " | " | 1400 | 10 | " | 2.35 | 5,161 | 1005 |
| 5 | 13.8MgO,34.9$Al_2O_3$ 51.3$SiO_2$ | 1350 | 3.5 | " | — | 7.639 | 1140 |
| 7 | 7+2 wt % $ZrO_2$ | 1375 | 10 | — | 2.40 | 7,920 | 1227 |
| " | 7+2 wt % $ZrO_2$ | 1400 | 10 | Cordierite + $ZrSiO_4$ | 2.23 | 14,223 | 1404 |
| 8 | 7+½ wt % Si | 1375 | 10 | Cordierite | 2.35 | 5,711 | 1110 |
| " | " | 1400 | 10 | Cordierite | 2.36 | 12,508 | 1580 |

*X-ray diffraction

The thermal expansion data clearly shows the superiority of the self-nucleated glass (Sample 6) over the same composition nucleate with either zirconium dioxide (Sample 7) or silicon (Sample 8). Density values indicate that densities from 87 to 94 percent of theoretical density were obtained. The average MOR values for Sample 6 represent satisfactory levels of strength for a variety of applications.

While there has been shown and described what are at present considered the preferred embodiments of the invention, it will be obvious to those skilled in the art that various changes and modifications may be made therein without departing from the scope of the invention as defined by the appended claims.

What is claimed is:

1. Process for producing a ceramic body consisting essentially of cordierite solid solution and having a linear thermal expansion of 600 to 900 ppm over the temperature range 25° C to 800° C, the process consisting essentially of:
    (a) forming a glass having a composition consisting essentially of 14 to 18 weight percent MgO, 28 to 32 weight percent $Al_2O_3$, and 52 to 56 weight percent $SiO_2$,
    (b) reducing the glass to finely divided particles,
    (c) forming the particles into a green compact, and
    (d) heating the compact at a temperature within the range of 1350° C to 1425° C to promote devitrification and sintering of the compact to form a structurally integrated ceramic body.

2. The process of claim 1 wherein a glass is formed having the composition consisting essentially of 15 to 17 weight percent MgO, 29 to 31 weight percent $Al_2O_3$, and 53 to 55 weight percent $SiO_2$.

3. The process of claim 1 in which the glass is formed by mixing oxides or materials which upon heating convert to oxides of Mg, Al, and Si, prereacting the mixture by heating at a temperature of from 800° to 1000° C for 1 to 4 hours, and melting the prereacted mixture at a temperature within the range of 1490° C to 1600° C for from 4 to 24 hours, the longer times corresponding to lower temperatures.

* * * * *